United States Patent
Wu et al.

[19]

[11] Patent Number: 5,963,676
[45] Date of Patent: Oct. 5, 1999

[54] MULTISCALE ADAPTIVE SYSTEM FOR ENHANCEMENT OF AN IMAGE IN X-RAY ANGIOGRAPHY

[75] Inventors: Zhenyu Wu, Maple Shade; Ming Fang, Cranbury, both of N.J.

[73] Assignee: Siemens Corporate Research, Inc., Princeton, N.J.

[21] Appl. No.: 08/796,331

[22] Filed: Feb. 7, 1997

[51] Int. Cl.[6] ............................................ G06K 9/40
[52] U.S. Cl. ................................ 382/274; 382/263
[58] Field of Search ........................ 382/128, 132–133, 382/274, 263, 284

[56] References Cited

U.S. PATENT DOCUMENTS

| | | | |
|---|---|---|---|
| 5,133,020 | 7/1992 | Giger et al. | 382/6 |
| 5,343,390 | 8/1994 | Doi et al. | 364/413.16 |
| 5,467,404 | 11/1995 | Vuylsteke et al. | 382/274 |

*Primary Examiner*—David K. Moore
*Assistant Examiner*—Stephen Brinich
*Attorney, Agent, or Firm*—Donald B. Paschburg

[57] ABSTRACT

A multi-scale approach to enhancement is taken where enhancement masks are generated at different scales and then combined together using a pyramid scheme. Each mask is computed from applying directional sensitive Laplacian kernels, which is responsible for extracting images of low contrast, followed by an adaptive non-linear mapping. This non-linearity is crucial in virtually eliminating edge overshoots. Furthermore, the input image may also be preprocessed by an edge-preserving smoothing filter to reduce the noise effect.

18 Claims, 8 Drawing Sheets

FIG.5.(a) ORIGINAL IMAGE (cb.1)

FIG.5.(d) ORIGINAL IMAGE (cb.2)

FIG.5.(b) ENHANCED IMAGE (cb.1)

FIG.5.(e) ENHANCED IMAGE (cb.2)

FIG.5.(c) MASK IMAGE (cb.1)

FIG.5.(f) MASK IMAGE (cb.2)

FIG.6.(a) ORIGINAL IMAGE (cb.3)

FIG.6.(d) ORIGINAL IMAGE (cb.4)

FIG.6.(b) ENHANCED IMAGE (cb.3)

FIG.6.(e) ENHANCED IMAGE (cb.4)

FIG.6.(c) MASK IMAGE (cb.3)

FIG.6.(f) MASK IMAGE (cb.4)

FIG.7.(a) ORIGINAL IMAGE (hf.1)

FIG.7.(d) ORIGINAL IMAGE (hf.4)

FIG.7.(b) ENHANCED IMAGE (hf.1)

FIG.7.(e) ENHANCED IMAGE (hf.4)

FIG.7.(c) MASK IMAGE (hf.1)

FIG.7.(f) MASK IMAGE (hf.4)

FIG.8.(a) ORIGINAL IMAGE (hf.3)

FIG.8.(d) ORIGINAL IMAGE (hf.4)

FIG.8.(b) ENHANCED IMAGE (hf.3)

FIG.8.(e) ENHANCED IMAGE (hf.4)

FIG.8.(c) MASK IMAGE (hf.3)

FIG.8.(f) MASK IMAGE (hf.4)

FIG.9.(a) ORIGINAL IMAGE (sp.1)

FIG.9.(d) ORIGINAL IMAGE (sp.4)

FIG.9.(b) ENHANCED IMAGE (sp.1)

FIG.9.(e) ENHANCED IMAGE (sp.4)

FIG.9.(c) MASK IMAGE (sp.1)

FIG.9.(f) MASK IMAGE (sp.4)

FIG.10.(a) ORIGINAL IMAGE (sp.3)

FIG.10.(d) ORIGINAL IMAGE (sp.4)

FIG.10.(b) ENHANCED IMAGE (sp.3)

FIG.10.(e) ENHANCED IMAGE (sp.4)

FIG.10.(c) MASK IMAGE (sp.3)

FIG.10.(f) MASK IMAGE (sp.4)

MULTISCALE ADAPTIVE SYSTEM FOR ENHANCEMENT OF AN IMAGE IN X-RAY ANGIOGRAPHY

BACKGROUND OF THE INVENTION

1. Field of the Invention

The present invention relates to image enhancement in X-ray angiography and more particularly to generating enhancement masks at different scales and then combining the enhancement masks together using a pyramid scheme hence enabling contrast improvement for image structures of different sizes.

2. Description of the Prior Art

Since the introduction of conventional angiography and digital subtraction angiography techniques, the examination and diagnosis of the arterial vascular system has become easier and more apparent for physicians. These techniques are now widely used in interventional radiological diagnosis and surgery. Despite advances in imaging technology, blood vessels in X-ray angiography often exhibit low intensity contrast with respect to their surrounding soft tissues. The problem is particularly severe for fine vessel structures.

A major challenge for enhancement is the ability to emphasize vessel structures without creating artifacts. Edge overshooting and noise magnification are among the main sources of artifacts resulting from existing enhancement methods used in clinical settings, such as the unsharp-masking method. In addition, the effectiveness of this and other methods is often limited to vessel structures at a predetermined scale.

U.S. Pat. No. 5,467,404 assigned to Agfa-Gevaert and entitled Method And Apparatus For Contrast Enhancement discloses enhancing a digital image by decomposing said original image into a sequence of detail images or into an array of coefficients representing detail strength at multiple resolution levels and a residual image, modifying each pixel of each detail image or each detail coefficient according to at least one non-linear monotonically increasing odd conversion function and constructing a processed image by accumulating detail obtained from the modified detail images or from the detail coefficients and further adding the residual image. This approach is aimed at enhancing, locally or globally, the dynamic range within the image (i.e. selected subband). Histogram equalization (globally or locally adaptive) is the method cited for the non-linear conversion of pixel values to achieve the enhancement objective.

It is an object of the present invention to provide a powerful computer aided perception system for physicians which can provide enhanced images for optimal visualization of blood vessels and consequently facilitate the extraction of valuable diagnostic information from angiographic images.

SUMMARY OF THE INVENTION

The drawbacks of the prior art are overcome by the present invention in which a multi-scale approach to enhancement is taken where enhancement masks are generated at different scales and then combined together using a pyramid scheme. Each mask is computed from applying directional sensitive Laplacian kernels, which is responsible for extracting images of low contrast, followed by an adaptive non-linear mapping. This non-linearity is crucial in virtually eliminating edge overshoots. Furthermore, the input image may also be preprocessed by an edge-preserving smoothing filter to reduce the noise effect. This filter is described in U.S. patent application Ser. No. 08/672,194 entitled A Novel Adaptive Edge-Preserving Smoothing Filter and assigned to the same assignee as the present invention.

DETAILED DESCRIPTION OF THE INVENTION

Figure 1:
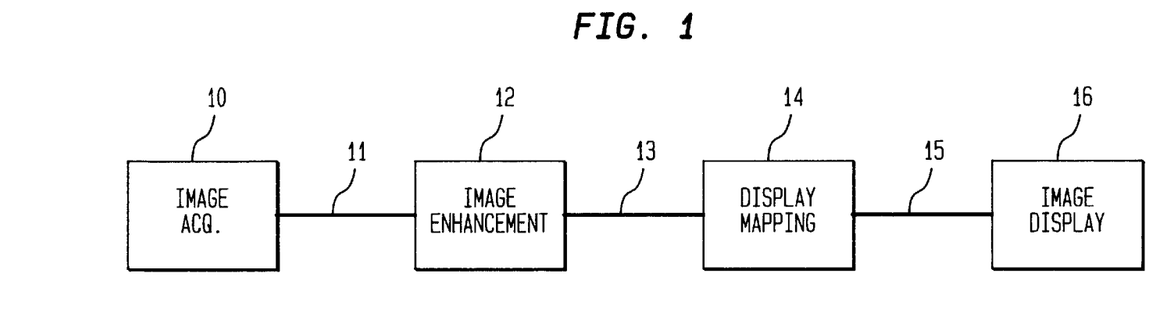
FIG. 1 illustrates an apparatus according to the present invention.

As stated above, the present invention includes an image enhancement system where enhancement masks are generated at different scales and then combined together using a pyramid scheme. FIG. 1 illustrates an image acquisition unit 10 that is capable of acquiring a digital image by sampling the output signal of an image sensor, such as a CCD sensor, a video camera, or an image scanner. An image intensifying tube quantifies it using an A/D converter into an array of pixel values with pixel values usually 8 to 12 bits long. The image intensifying tube then temporarily stores the pixel values in memory if desired, and transmits the digital image 11 to an image enhancement unit 12. Here the image contrast is adaptively enhanced in accordance with the present invention. Next, the enhanced image 13 is transmitted to the display mapping section 14 which modifies the pixel values such that the relevant image information is presented in an optimal way when the processed image 15 is visualized on an image output device 16. The image output device could be either a storage device, a viewable image on a display screen or a hardcopy on a transparent film or paper.

Figure 2:
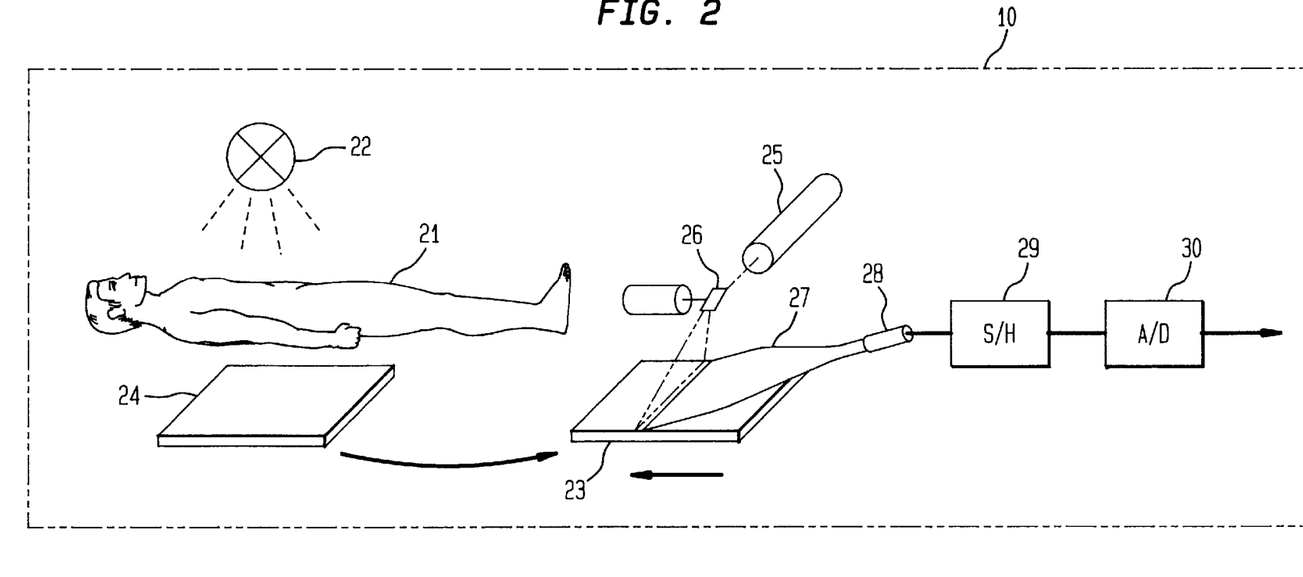
FIG. 2 illustrates one embodiment of an image acquisition unit.

One embodiment of image acquisition unit 10 is shown in FIG. 2. A radiation image of an object 21, or part thereof, is recorded onto a photostimulable phosphor plate by exposing said plate to X-rays. Contrast agent is injected into the object's arteries before the X-ray images are taken to increase the attenuation coefficients of the tinted blood so that the vessels will become visible. The X-rays originate from an X-ray source 22 and are transmitted through object 21. Photostimulable phosphor plate 23 is conveyed in a cassette 24. In a radiation image readout apparatus the latent image stored in the photostimulable phosphor plate is read out by scanning the phosphor sheet with stimulating rays emitted by a laser 25. The stimulating rays are deflected according to the main scanning direction by means of a galvanometric deflection device 26. A light collector 27 directs the light obtained by stimulated emission onto a photomultiplier 28 where it is converted into an electrical signal. The electrical signal is then sampled by a sample and hold circuit 29 and converted into a twelve bit digital signal by means of an analog to digital converter 30. From here, the digital image is sent to image enhancement.

Figure 3:
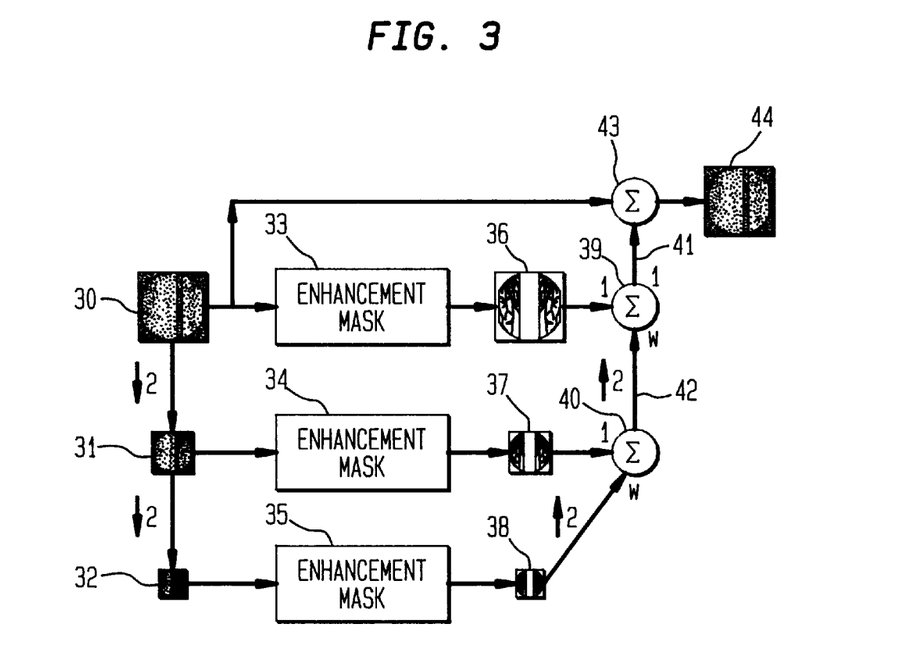
FIG. 3 illustrates a flow diagram of the multi-scale enhancement system of the present invention.

Image enhancement, 12 of FIG. 1, includes an image contrast enhancement system which takes a multi-scale approach. A flow diagram of the image contrast enhancement system is shown in FIG. 3. A pyramid of intensity images 30, 31, 32 is generated from an original image 30 using wavelet decomposition. This is further described by S. G. Mallat in "A Theory For Multiresolution Signal Decomposition: The Wavelet Representation" *IEEE Trans. on Pattern Anal. Machine Intell.*, vol. 7, pp. 674–693, July 1989. The number of levels of the pyramid depends on the size of the original image 30. For images of 880×880 pixels, a pyramid of four levels is used. Three levels are shown in FIG. 3. At each pyramid level, an enhancement mask generator 33, 34, 35 computes an enhancement mask 36, 37, 38 which captures the displayed fine image structures in the image 30, 31, 32 at that scale. These enhancement masks 36, 37, 38 are then combined recursively through summations 39, 40 as follows to form a single composite mask 41. The mask 38 at the coarsest scale is first transformed to the scale of its parent image 31 by wavelet synthesis. It is then weighted (weight<1) and added through summation 40 to the mask 37 from the parent to form a composite mask 42. This process is repeated until the resulting composite mask 41 reaches the full resolution. Finally, the enhanced image 44 is obtained by adding through summation 43 this composite mask 41 to the original image 30. As a result, this multi-scale approach is able to enhance contrast for image structures of different sizes. In addition, this approach allows the component of enhancement mask generation to focus only on the fine structures of the original image 30.

The component of enhancement mask generator 33, 34, 35 consists of the computation of a directional sensitive Laplacian of the image and a nonlinear mapping of the Laplacian. This is further described by A. K. Jain in "Fundamentals Of Digital Image Processing", *Prentice Hall, Inc.*, New Jersey, 1989. Since the present invention needs to be only concerned with extracting fine structures in the image at each pyramid level, small 3×3 kernels can be used for computing the Laplacian. Four kernels which are tuned respectively to 0 degrees, 45 degrees, 90 degrees and 135 degrees, are used to extract line-like fine structures. Gaussian smoothing is applied to the image before the Laplacian computation in order to reduce the noise sensitivity. From the four kernel responses, the one with the largest magnitude is kept. The use of directional sensitive kernels allows the extraction of lines with very low contrast to its surroundings.

Once the Laplacian is computed, it goes through a non-linear mapping to form the enhancement mask. Let I, $I_{lap}$, M denote the input intensity image, the Laplacian and the enhancement mask, respectively. At a pixel (x,y), the mask value, M(x,y), is computed according to the following non-linear function:

$$M(x, y) = \begin{cases} 0 & \text{if } \lambda I_{lap}(x, y) + I(x, y) > \alpha I(x, y) \\ \beta I(x, y) - I(x, y) & \text{if } \lambda I_{lap}(x, y) + I(x, y) < \beta I(x, y) \\ \lambda I_{lap}(x, y) & \text{otherwise} \end{cases} \quad (1)$$

In Eq.(1), $\lambda$ is a positive gain factor and $\alpha$ and $\beta$ are control parameters of the non-linearity. In testing the system of the present invention, the value of $\alpha$ was fixed to 0.98 and the values of $\lambda$ and $\beta$ were allowed to vary using sliding bars, with nominal values of $\lambda=12.5$ and $\beta=0.75$. The non-linear mapping in Eq.(1) plays a crucial role in virtually eliminating positive edge overshoots and greatly reducing negative overshoots. Remaining negative edge overshoots are further attenuated when masks from different scales are combined together to form the composite enhancement mask.

Figure 4:
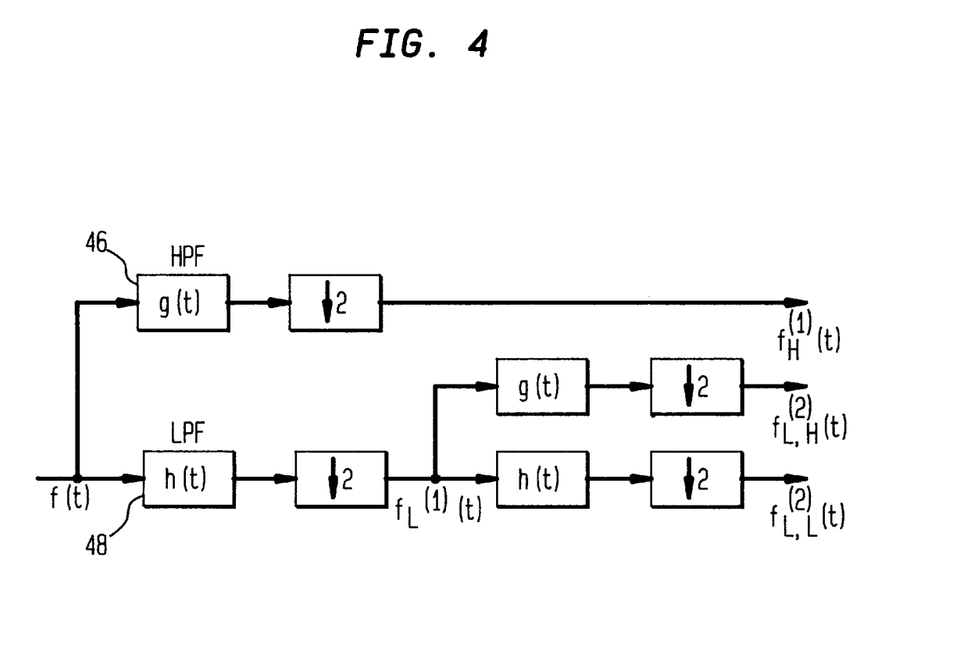
FIG. 4 illustrates differences in the scale space between the present invention and the prior art.

FIG. 4 illustrates differences in the scale space between the prior art as described above, U.S. Pat. No. 5,467,404, and the present invention. FIG. 4 illustrates the scale space using two-level decomposition of a 1D signal. In FIG. 4, high pass filter 46 and low pass filter 48 are quadrature mirror filters, examples of which can be found in S. G. Mallat's "A Theory For Multiresolution Signal Decomposition: The Wavelet Representation" *IEEE Trans. on Pattern Anal. Machine Intell.*, vol. 7, pp. 674–693, July 1989. U.S. Pat. No. 5,467,404 uses detail images from subband decomposition: $\{f_H^{(1)}(t), f_{L,H}^{(2)}(t), f_{L,L}^{(2)}(t)\}$. Also, the enhanced image is obtained by combining the enhanced detail images via reconstruction from the subbands. The present invention however, uses an intensity pyramid $\{f(t), f_L^{(1)}(t), f_{L,L}^{(2)}(t)\}$ as shown in FIG. 4. Also the enhanced image is obtained by first computing a combined enhancement mask, which is a weighted sum of individual masks computed at each scale and then this combined image mask is then added to the original image.

A computer software system based on the described image enhancement system of the present invention has been developed. Extensive experimental testing has been conducted using a large number of clinical peripheral angiographic images. The images were collected from major hospitals in the USA and Germany with different clinical protocols, image sizes and other acquisition parameters. The results demonstrated remarkable contrast improvement in fine image structures such as vessel structures. For all of these tests, the control parameters described above were set to their nominal values of $\lambda=12.5$ and $\beta=0.75$.

Figure 5:
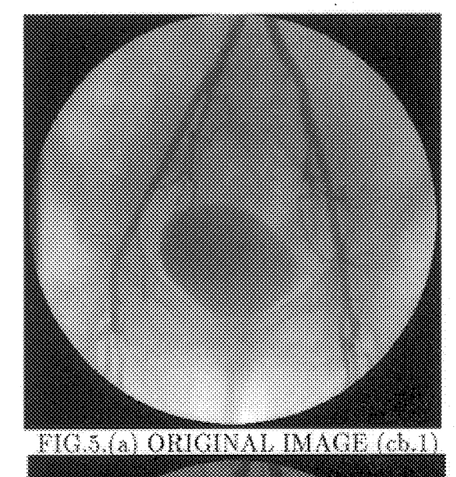
FIGS. 5A–5F illustrate enhancement results for images cb.1 and cb.2.
Figure 6:
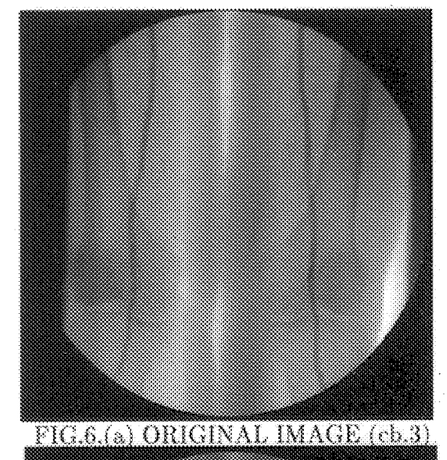
FIGS. 6A–6F illustrate enhancement results for images cb.3 and cb.4.
Figure 7:
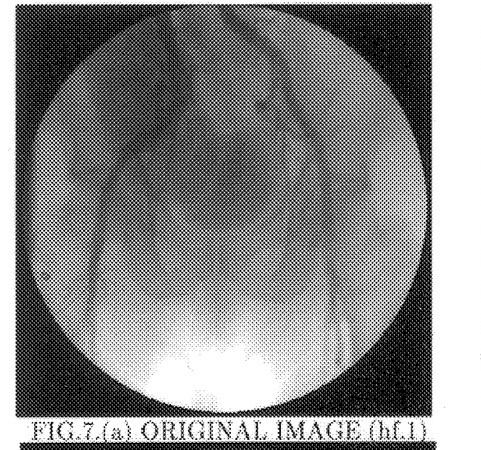
FIGS. 7A–7F illustrate enhancement results for images sp.1 and sp.2.
Figure 8:
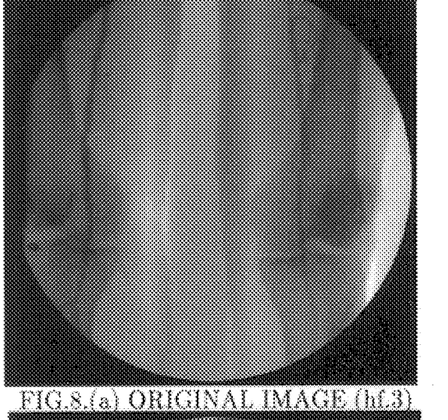
FIGS. 8A–8F illustrate enhancement results for images sp.3 and sp.4
Figure 9:
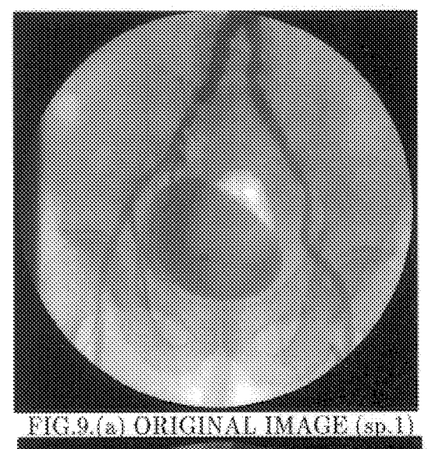
FIGS. 9A–9F illustrate enhancement results for images hf.1 and hf.2.
Figure 10:
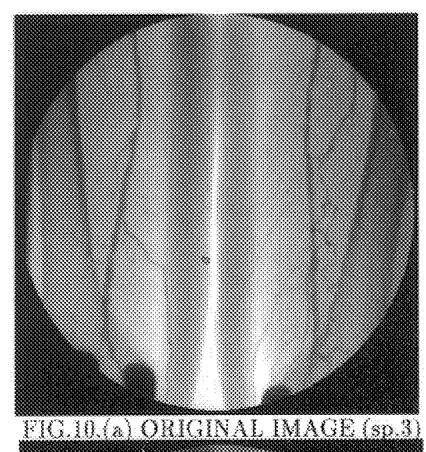
FIGS. 10A–10F illustrate enhancement results for images hf.3 and hf.4.

Enhancement results for images from three perivision studies are reported here to illustrate the performance of the enhancement system. During the perivision studies, images were acquired at several positions by moving the image intensifier through a series of predefined stations to cover the entire lower extremities of an individual. At each station, several frames were acquired to ensure that the images with the most vessel contrast were captured. For all three studies, the images were acquired by using four stations. Only the enhancement results for the most opacified frame (the frame with the most vessel contrast) at each station is shown. Other frames show comparable vessel contrast improvement. Code names "cb", "sp" and "hf" are used to distinguish the three studies. In addition, an extension is appended to the code name to identify the individual frames. For example, cb.1 is the image acquired at the first station in the cb study. FIG. 5 shows the enhancement results for the images cb.1 and cb.2: original images (FIGS. 5*a* and 5*d*), enhanced images (FIGS. 5*b* and 5*e*) and composite enhancement masks (FIGS. 5*c* and 5*f*). Due to their large size, all the images are displayed at about one fifth scale, although all of the computations are carried out for images at full scale. Note that many fine vessel structures, hardly visible in the original images, can now be visualized with exquisite details after enhancement. Since there is no vessel segmentation involved, bone edges are also enhanced along with the vessels. This is most noticeable for pelvic bone edges (e.g. FIG. 5*b*). It is understood, however, that physicians are not disturbed by enhanced bone edges and that they are particularly pleased with a greater definition of vessels against background bone structures (e.g. FIG. 5e). FIG. 6 shows the enhancement results for the remaining images in the cb study. FIGS. 7 through 10 show the similar effectiveness of the enhancement system with images in the sp and hf studies.

A novel multi-scale adaptive enhancement system has been described, which provides a powerful computer-aided-perception tool for physicians to visualize low-contrast image structures such as blood vessels in X-ray angiographic images with exquisite details. Extensive testing has demonstrated remarkable contrast improvement in blood vessels with no perceivable artifacts.

It is not intended that this invention be limited to the hardware or software arrangement or operational procedures shown disclosed. This invention includes all of the alterations and variations thereto as encompassed within the scope of the claims as follows.

We claim:

1. A multiscale adaptive system for enhancement of an image in x-ray angiography comprising:
    an image acquisition system for acquiring an input image;
    an image contrast enhancement system connected to said image acquisition system for utilizing a multiscale approach to enhancement;
    a display mapping system connected to said image contrast enhancement system for modifying pixel values such that relevant image information is presented in an optimal way; and,
    an image display apparatus connected to said display mapping system for presenting an enhanced image;
    wherein said image contrast enhancement system comprises:
        a pyramid system wherein a pyramid of intensity images are generated at pyramid levels from said input image;
        an enhancement mask generator wherein enhancement masks of said intensity images are generated at each of said pyramid levels;
        a combination system wherein said enhancement masks are combined together to form a single composite mask; and,
        an enhanced image generator wherein said single composite mask is combined with said input image to form an enhanced image.

2. A multiscale adaptive system for enhancement of an image in x-ray angiography as claimed in claim 1 wherein said combination system comprises:
    transformation means for transforming mask at a coarsest scale to scale of its parent image;
    weighting means connected to said transformation means;
    adding means for adding said weighted transformed mask to mask of said parent image repeatably to form said single composite mask that is at full resolution.

3. A multiscale adaptive system for enhancement of an image in x-ray angiography as claimed in claim 2 wherein said transformation means comprises:
    wavelet synthesis means.

4. A multiscale adaptive system for enhancement of an image in x-ray angiography as claimed in claim 2 wherein said enhancement mask generator comprises:
    a first computation means for computing a directional sensitive Laplacian of said intensity images; and,
    a second computation means for computing a nonlinear mapping of said directional sensitive Laplacian.

5. A multiscale adaptive system for enhancement of an image in x-ray angiography as claimed in claim 4 wherein:
    said first computation means utilizes small 3×3 kernels for computing said directional sensitive Laplacian.

6. A multiscale adaptive system for enhancement of an image in x-ray angiography as claimed in claim 4 wherein:
    said first computation means utilizes four kernels which are tuned respectively to 0 degrees, 45 degrees, 90 degrees and 135 degrees to extract line-like fine structures.

7. A multiscale adaptive system for enhancement of an image in x-ray angiography as claimed in claim 4 further comprising:
    Gaussian smoothing means for applying Gaussian smoothing to said intensity images before said intensity image enters said first computation means.

8. A multiscale adaptive system for enhancement of an image in x-ray angiography as claimed in claim 4 wherein:
    said second computation means is represented by:

$$M(x, y) = \begin{cases} 0 & \text{if } \lambda I_{lap}(x, y) + I(x, y) > \alpha I(x, y) \\ \beta I(x, y) - I(x, y) & \text{if } \lambda I_{lap}(x, y) + I(x, y) < \beta I(x, y) \\ \lambda I_{lap}(x, y) & \text{otherwise} \end{cases} \quad (1)$$

where I, $I_{lap}$, M denote said input intensity image, said directional sensitive Laplacian and said enhancement masks, respectively, M(x,y) denotes the mask value at a pixel (x,y), $\lambda$ is a positive gain factor and $\alpha$ and $\beta$ are control parameters of non-linearity.

9. A multiscale adaptive system for enhancement of an image in x-ray angiography as claimed in claim 4 wherein:
    said second computation means virtually eliminates positive edge overshoots and greatly reduces negative overshoots.

10. A multiscale adaptive system for enhancement of blood vessels in x-ray angiography as claimed in claim 1 further comprising:
    an edge preserving smoothing filter for preprocessing said input image to reduce noise effect.

11. A multiscale adaptive system for enhancement of an image in x-ray angiography comprising:
    an image contrast enhancement system for utilizing a multiscale approach to enhancement wherein said image contrast enhancement system comprises:
    a pyramid system wherein a pyramid of intensity images are generated at pyramid levels from an input image;
    an enhancement mask generator wherein enhancement masks of said intensity images are generated at each of said pyramid levels;
    a combination system wherein said enhancement masks are combined together to form a single composite mask; and,
    an enhanced image generator wherein said single composite mask is combined with said input image to form an enhanced image.

12. A multiscale adaptive system for enhancement of an image in x-ray angiography as claimed in claim 11 wherein said combination system comprises:
    transformation means for transforming mask at a coarsest scale to scale of its parent image;
    weighting means connected to said transformation means;
    adding means for adding said weighted transformed mask to mask of said parent image repeatably to form said single composite mask that is at full resolution.

13. A multiscale adaptive system for enhancement of an image in x-ray angiography as claimed in claim 12 wherein said transformation means comprises:

wavelet synthesis means.

14. A multiscale adaptive system for enhancement of an image in x-ray angiography as claimed in claim 11 wherein said enhancement mask generator comprises:

a first computation means for computing a directional sensitive Laplacian of said intensity images; and, a second computation means for computing a nonlinear mapping of said directional sensitive Laplacian.

15. A multiscale adaptive system for enhancement of an image in x-ray angiography as claimed in claim 14 wherein:

said first computation means utilizes small 3 x 3 kernels for computing said directional sensitive Laplacian.

16. A multiscale adaptive system for enhancement of an image in x-ray angiography as claimed in claim 14 wherein:

said first computation means utilizes four kernels which are tuned respectively to 0 degrees, 45 degrees, 90 degrees and 135 degrees to extract line-like fine structures.

17. A multiscale adaptive method for enhancing an image in x-ray angiography comprising the steps of:

acquiring an input image;

enhancing said input image through a multiscale approach;

performing display mapping to modify pixel values such that relevant image information is presented in an optimal way; and, displaying said enhanced image;

wherein enhancing said input image comprises the steps of:

generating a pyramid of intensity images at pyramid levels from said input image;

generating enhancement masks from said intensity images at each of said pyramid levels;

first combining said enhancement masks together to form a single composite mask; and, second combining said single composite mask with said input image to form an enhanced image.

18. A multiscale adaptive method for enhancing an image in x-ray angiography as claimed in claim 17 wherein first combining comprises the steps of:

transforming mask at a coarsest scale to scale of its parent image to provide a transformed mask;

performing a weighting to said transformed mask;

adding said weighted transformed mask to mask of said parent image repeatably to form said single composite mask that is at full resolution.

* * * * *